(12) United States Patent
Lee

(10) Patent No.: US 8,546,981 B2
(45) Date of Patent: Oct. 1, 2013

(54) ACTUATOR

(75) Inventor: Kyung Min Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 62 days.

(21) Appl. No.: 13/172,396

(22) Filed: Jun. 29, 2011

(65) Prior Publication Data

US 2012/0119592 A1    May 17, 2012

(30) Foreign Application Priority Data

Nov. 16, 2010  (KR) .......................... 10-2010-0114124

(51) Int. Cl.
*H02K 41/02* (2006.01)
(52) U.S. Cl.
USPC .......................... 310/12.14; 310/112; 310/114
(58) Field of Classification Search
USPC ....................................... 310/12.14, 112–114
See application file for complete search history.

(56) References Cited

U.S. PATENT DOCUMENTS 4,340,261 A * 7/1982 Wehde ........................ 310/90.5
2001/0043016 A1* 11/2001 Chun et al. ...................... 310/12

FOREIGN PATENT DOCUMENTS

| KR | U1999-0019875 | 6/1999 |
| KR | 10-2000-0024065 | 5/2000 |
| KR | 10-2001-0106540 A | 12/2001 |
| KR | 10-2005-0098139 | 10/2005 |
| WO | 2008107273 A1 | 9/2008 |

* cited by examiner

*Primary Examiner* — Tran Nguyen
*Assistant Examiner* — Leda Pham
(74) *Attorney, Agent, or Firm* — Edwards Wildman Palmer LLP; Peter F. Corless

(57) ABSTRACT

An actuator is provided, which includes a main shaft having a first shaft portion for generating a magnetic field in a linear direction and a second shaft portion for generating a magnetic field in a rotational direction, and a coil wound around an outer peripheral surface of the main shaft. The actuator performs both a rotational driving function and a straight driving function via a single unit to improve the positional accuracy and provide spatial efficiency, thereby improving the merchantable quality of the actuator.

2 Claims, 3 Drawing Sheets

ACTUATOR

CROSS-REFERENCE TO RELATED APPLICATION

This application is based on and claims priority from Korean Patent Application No. 10-2010-0114124, filed on Nov. 16, 2010 in the Korean Intellectual Property Office, the disclosure of which is incorporated herein in its entirety by reference.

BACKGROUND OF THE INVENTION

1. Field of the Invention

The present invention relates to a single unit actuator, and more particularly, to an actuator capable of performing both rotational driving functions and linear driving functions via one unit.

2. Description of the Prior Art

In general, a motor is an actuator for converting an electromagnetic energy generated by an electromagnetic coil and magnets into machinery energy. Various kinds of motors including a pneumatic motor and an electric motor have been developed and are developing to meet the needs of the times. Particularly, the pneumatic motor is widely used in the field of large-size and heavy duty industrial machines, and the electric motor is widely used in situations where a compact and light weight motor is needed.

Generally, an actuator includes a rotor, installed at a hollow portion of a housing, for rotating an external device, and a driving unit, installed at a sidewall of the housing, for rotating the rotor. Various devices are used as the driving unit. The rotor is rotated by a piston, a gear or a turbine device in the pneumatic or hydraulic motor. In the electric motor, a rotational magnetic field is generated by applying an Alternating Current or Direct Current to a stator, and the rotor is rotated by mutual electromagnetic force acting between currents induced from the rotational magnetic field.

FIGS. 1A and 1B are views illustrating an actuator in the related art.

A conventional actuator includes, as shown in FIG. 1, an actuator 10 which is able to move in a straight line, and an actuator 20 which is able to rotate. The actuators 10 and 20 are selectively driven depending upon situations requiring rotation movement and linear movement.

In order to simultaneously perform the rotational movement and the linear movement, however, two actuators should be driven by a controller, and separate jigs are required to accurately arrange two actuators, which causes a spatial problem in smaller spaces. Furthermore, whenever separate jigs are used, it is difficult to obtain the position accuracy due to errors.

SUMMARY OF THE INVENTION

The present invention provides an actuator capable of performing a rotational driving function and a linear driving function via one unit. More specifically, the actuator includes a main shaft having a first shaft portion for generating a magnetic field in an omnidirection, and a second shaft portion for generating a magnetic field in a rotational direction. In addition the actuator also includes a coil wound around an outer peripheral surface of the main shaft.

Advantageously, the actuator illustrated in the present invention can perform a rotational driving function and a straight driving function with a single unit to improve the positional accuracy and save space where spatial availability is low, thereby improving merchantable quality of the actuator.

BRIEF DESCRIPTION OF THE DRAWINGS

The above and other objects, features and advantages of the present invention will be more apparent from the following detailed description taken in conjunction with the accompanying drawings, in which.

Figure 1:
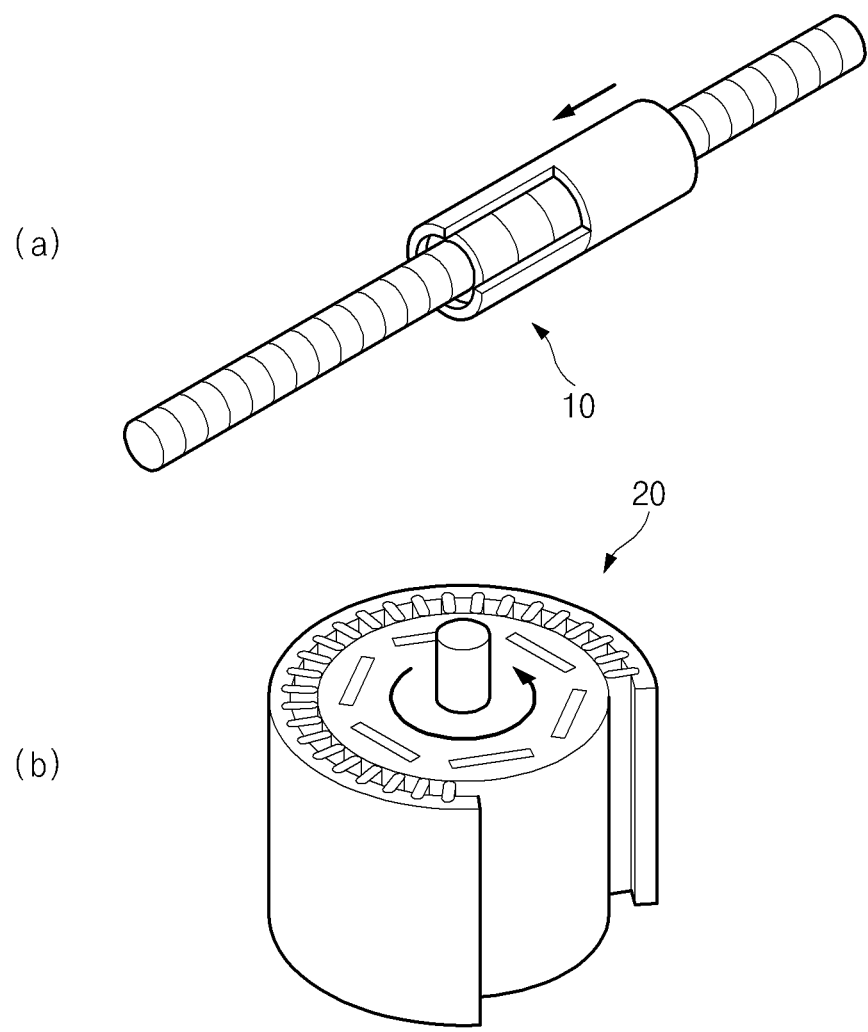
FIGS. 1A and 1B are views illustrating an actuator in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter, preferred embodiments of the present invention will be described with reference to the accompanying drawings. In the entire description of the present invention, the same drawing reference numerals are used for the same elements across various figures. A first embodiment of the invention is first described as a representative embodiment, and in other embodiments of the invention, only configurations that different from those of the first embodiment will be described.

Figure 2:
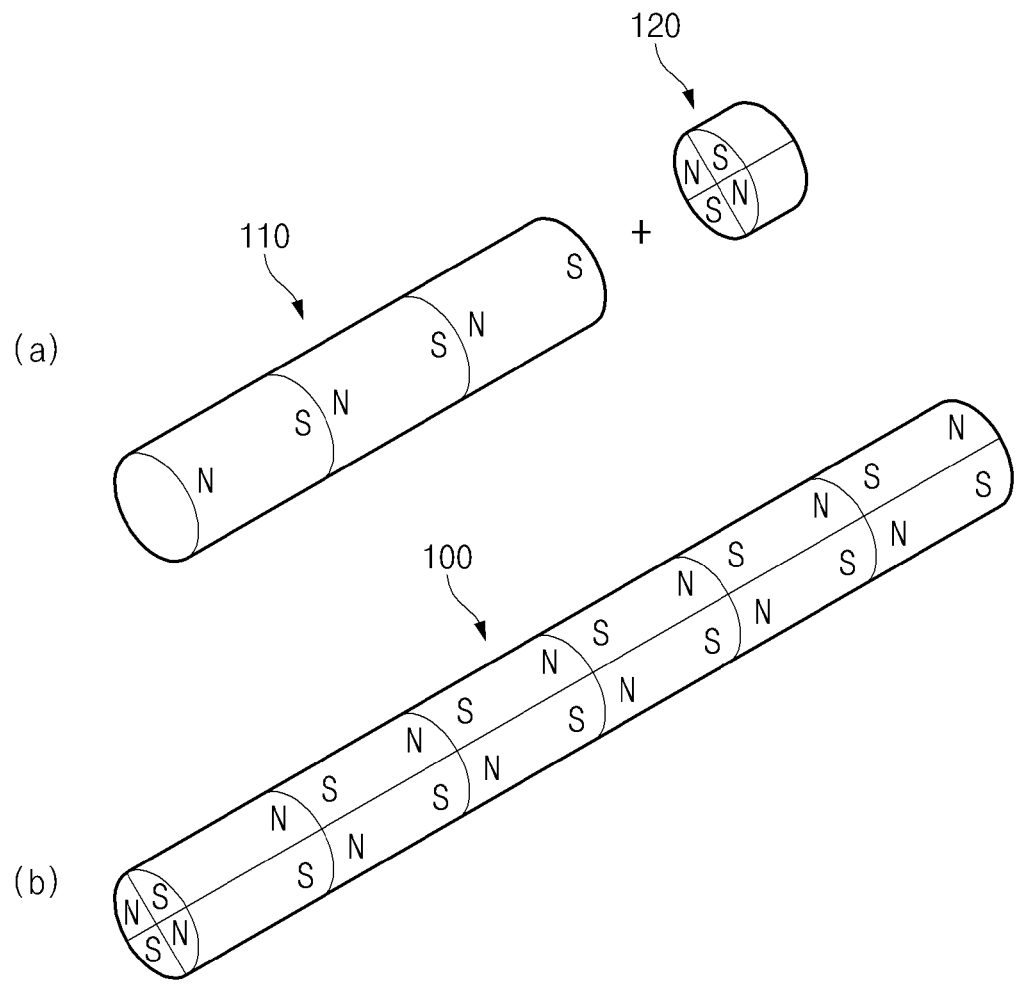
FIG. 2A is a view illustrating a first shaft portion and a second shaft portion of an actuator according to the present invention.
FIG. 2B is a view illustrating a main shaft of an actuator according to the present invention.
Figure 3:
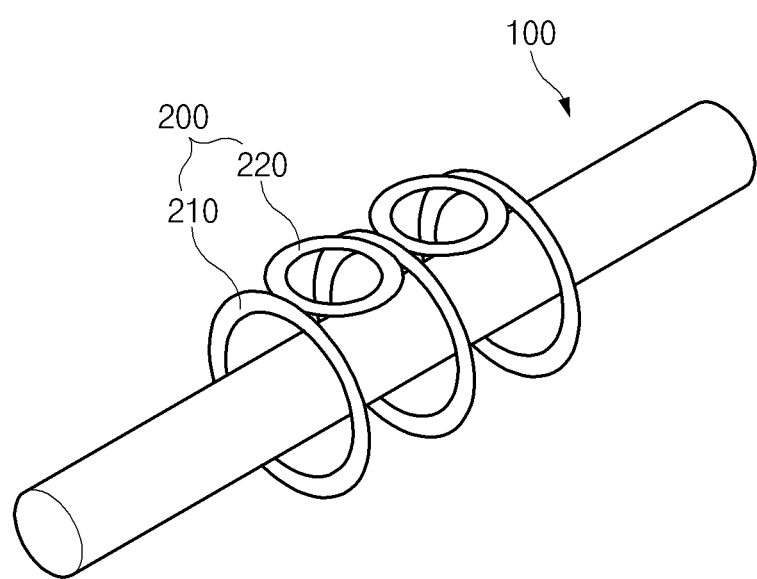
FIG. 3 is a view illustrating a first coil and a second coil coupled to a main shaft of an actuator according to the present invention.

FIGS. 2A to 3 show an actuator according to the present invention. FIGS. 2A and 2B are views illustrating a first shaft portion, a second shaft portion, and a main shaft of the actuator according to the present invention, and FIG. 3 is a view illustrating a first coil and a second coil coupled to a main shaft of the actuator according to the present invention.

An exemplary embodiment of the present invention will now be described in detail with reference to the accompanying drawings.

The actuator according to the present invention includes, as shown in FIGS. 2 and 3, a main shaft 100 having a first shaft portion 110 and a second shaft portion 120 to generate a magnetic field in a omnidirection (i.e., the magnetic field generated and projected is in all directions). Additionally, a coil 200 is wound around an outer peripheral surface of the main shaft 100 and has a first coil 210 and a second coil 220, in which a rotational driving function and a linear driving function can be performed with a single unit.

Each component of the actuator according to the present invention will now be described with reference to the accompanying drawings.

First, with the actuator according to the present invention, the coil 200 is wound around the main shaft 100 which has an associated magnetic field. As shown in FIGS. 2A and 2B, the main shaft 100 includes the first shaft portion 110 for generating a magnetic field in a straight direction, and a second shaft portion 120 for generating a magnetic field in a rotational direction. Thus, if the first shaft portion 110 and the second shaft portion 120 are coupled to each other, as shown in FIG. 2B, a permanent magnet for generating a magnetic field in all directions is formed (i.e., an omnidirectional magnetic field).

As shown in FIG. 3, the coil 200 is formed in a ring or circular shape, and is positioned on the outer peripheral surface of the main shaft 100. In this instance, the coil 200 includes the first coil 210 and the second coil 220. The first coil 210 receives the outer peripheral surface of the main shaft 100 in a longitudinal direction, and the second coil 220 is interposed between the first coils 210 which receive the main shaft 100 therein.

The operation and effect of the actuator according to the present invention will now be described.

As shown in FIGS. 2A to 3, the coil 200 including the first coil 210 and the second coil 220 is positioned on the outer peripheral surface of the main shaft 100 including the first shaft portion 110 and the second portion shaft 120 to generate the magnetic field in all directions.

In this instance, the main shaft 100 is inserted into the first coils 210 in the longitudinal direction in such a way that the main shaft can be linearly moved, and the second coil 220 is interposed between the first coils 210 receiving the main shaft 100 in such a way that the second coil can be rotated. As a result, the actuator according to the present invention can perform the linear movement and the rotational movement with a single unit to minimize the amount of space which the unit takes up, and to reduce errors which can occur due to the coupling of an actuator for linear movement and an actuator for rotational movement in the related art.

Advantageously the actuator includes the main shaft embodying as a single unit the first shaft portion for generating the magnetic field in the straight direction, and the second shaft portion for generating the magnetic field in the rotational direction, and the coil wound around the outer peripheral surface of the main shaft. Accordingly, the actuator can perform the rotational driving function and the linear driving function via the single unit to improve the positional accuracy and provide spatial efficiency, thereby improving the merchantable quality of the actuator.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An actuator comprising:
a main shaft having a first shaft portion configured to generate a magnetic field in a linear direction, and a second shaft portion configured to generate a magnetic field in a rotational direction; and
a coil wound around an outer peripheral surface of the main shaft wherein the coil includes a plurality of first coils and a plurality of second coils and the main shaft is inserted into the plurality of first coils in such a way that the main shaft is moved in linear movement, and the second coils are interposed between the first coils in such a way that the shaft is rotated.

2. The actuator according to claim 1, wherein the main shaft generates a magnetic force in an omnidirection using the first shaft portion and the second shaft portion in combination.

* * * * *